Figure 4:
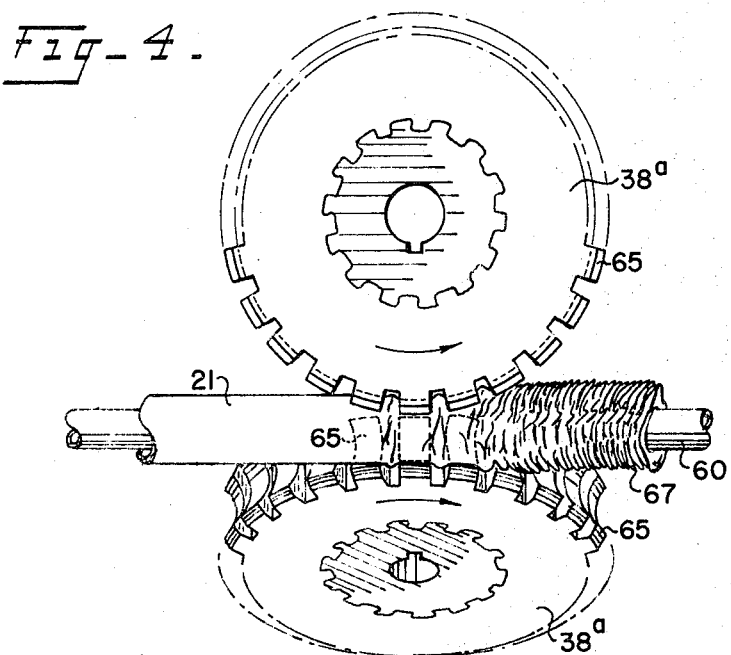

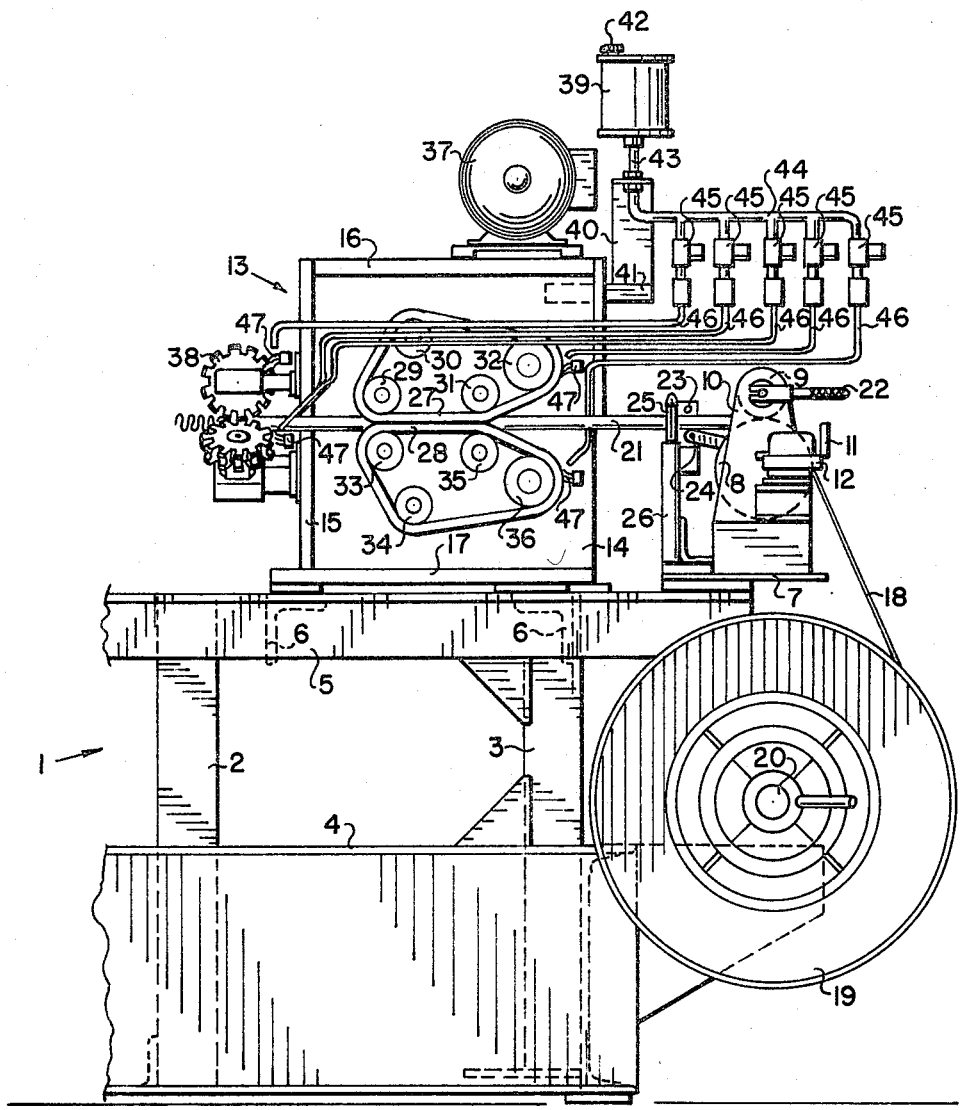

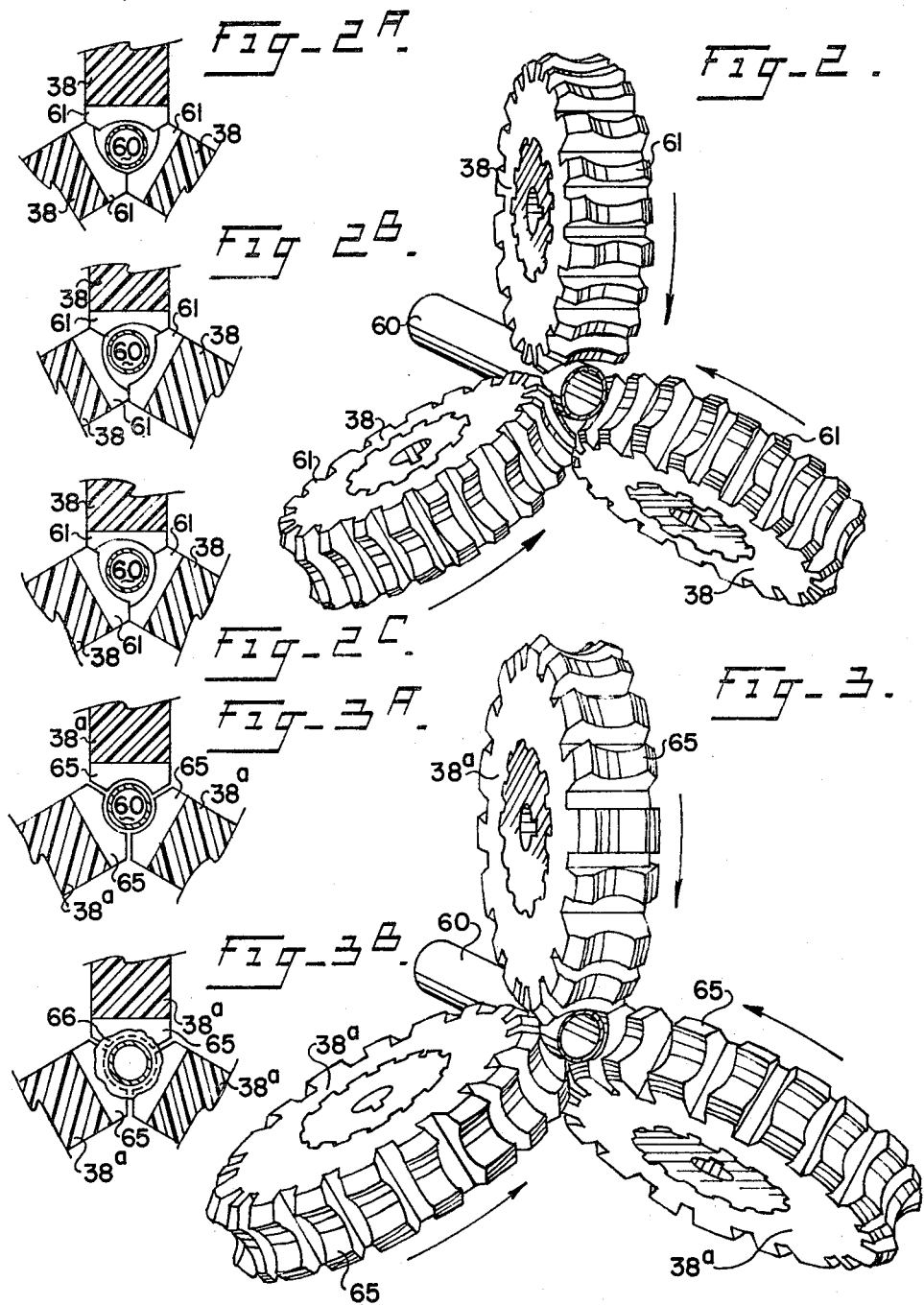

Aug. 16, 1966  J. W. CLEMENT  3,266,911
METHOD OF SHIRRING SYNTHETIC TUBULAR SAUSAGE CASING
Filed Oct. 7, 1963  4 Sheets-Sheet 3

INVENTOR.
JAMES W. CLEMENT.
BY Neal J Mosely
his Attorney

Aug. 16, 1966   J. W. CLEMENT   3,266,911
METHOD OF SHIRRING SYNTHETIC TUBULAR SAUSAGE CASING
Filed Oct. 7, 1963   4 Sheets-Sheet 4
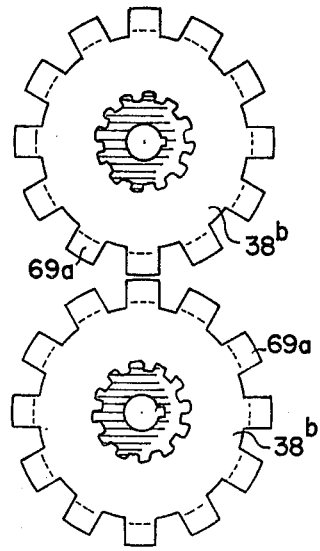
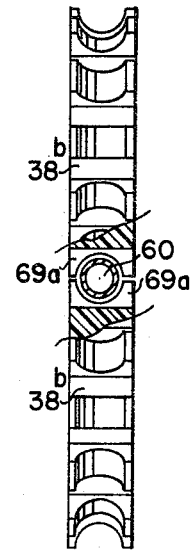
Fig-7.   Fig-8.
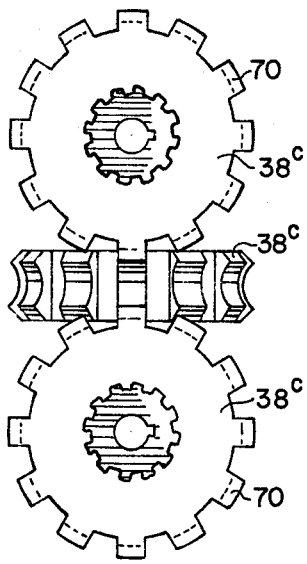
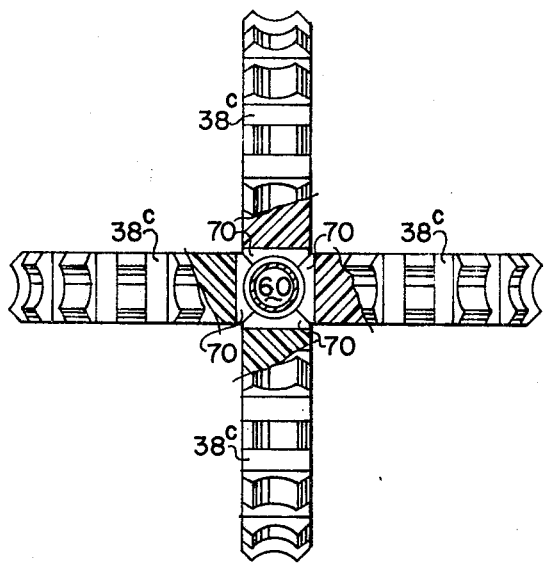
Fig-9.   Fig-10.
INVENTOR.
JAMES W. CLEMENT
BY Neal J. Mosely
his Attorney

United States Patent Office 3,266,911  
Patented August 16, 1966

3,266,911  
METHOD OF SHIRRING SYNTHETIC TUBULAR SAUSAGE CASING  
James W. Clement, Chicago, Ill., assignor to Tee-Pak, Inc., Chicago, Ill., a corporation of Illinois  
Filed Oct. 7, 1963, Ser. No. 314,215  
1 Claim. (Cl. 99—176)

This invention relates to new and useful improvements in the shirring of artificial sausage casings, such as casings made of regenerated cellulose, cellulose derivatives, amylose, collagen, or the like.

Artificial sausage casings, particularly casings formed of regenerated cellulose and other synthetic materials, are prepared as hollow thin wall tubes of very great length. For convenience in handling, the casings are shirred from lengths varying from 40 to 160 feet or more down to a shirred and compressed length of the order of a few inches. Many years ago, natural and synthetic sausage casings were shirred by hand into short strands which were supported on a storage core or tube. Through the years a number of improved machines for shirring sausage casings have been developed. An early type shirring machine and the resulting shirred product are shown in Dietrich U.S. Patent 2,010,626. Improved forms of shirring machines and the products thereof are shown in Korsgaard U.S. Patent 2,583,654; Blizzard et al. U.S. Patents 2,722,714, 2,722,715, and 2,723,201; and Matecki U.S. Patents 2,983,949 and 2,984,574. The invention disclosed herein is an improvement over the shirring machines and methods described in the aforementioned patents.

When a casing is shirred, it is packaged and shipped to a meat packing house where individual shirred strands are placed on stuffing horns and meat emulsion pumped into the casing to fill it to its fully extended length. The stuffing of the casing usually takes place within a few seconds with the result that the casing is extended from a shirred length of 8 to 27" to an extended length of 40 to 160' or more in a matter of three to twelve seconds. This rapid extension of the casing during stuffing requires the casing to be especially strong and resistant to tearing. If even minor holes develop in the casing, the casing may split or break during the stuffing and waste a large quantity of meat. In the shirring of artificial sausage casings, the pleats which are formed are sometimes interlocked and are almost always nested in a concave manner to provide the tightly compressed strand of casing for shipping and handling.

When shirring machines of the type shown in Dietrich U.S. Patent 2,010,626 were in use, the shirred casing which were produced were accordion pleated but did not have nested concave pleats which were tightly compacted to provide shirred strands which were self-supporting. As a result, the shirred casing strands had to be packaged in small individual packages which were easily removed from the strand at the packing house after insertion over a stuffing horn. These individual cartons were apertured on both ends and the package casings were humidified to render the casing more flexible by passing moist air over and through the casing strands.

The development of improved shirring machines of the type shown in the Korsgaard, Blizzard et al., and Matecki patents made possible the shirring of greater lengths of casing than had been previously possible.

The shirring machine shown in the Korsgaard patent comprises an intermittently operating shirring head arranged to cooperate with an intermittently operable turret. The turret includes four hollow mandrels, each associated with a compressor-doffer unit mounted in equal spaced relationship about the turret and arranged to be rotated about a horizontal axis. Mechanism is provided for advancing the compressor-doffer unit associated with a mandrel in the shirring position to move the mandrel through the shirring head and into the open and unshirred end of the casing which is to be shirred on the mandrel. Air under slight pressure flows through the mandrel to inflate the casing and to maintain it in spaced relation to the mandrel and in such position that it can be grasped by the shirring dogs of the shirring head to effect the shirring operation. At a predetermined time in the cycle of operation, the shirring head is operated to shirr the casing onto the mandrel. At the same time the compressor-doffer unit is moved away from the shirring head and the mandrel is withdrawn therefrom. The actual shirring operation takes place between the retreating forward end of the compressor-doffer unit and the last set of shirring dogs in engagement with the casing. When a predetermined length of casing has been shirred onto the mandrel, the same is cut off.

Thereupon the turret is rotated through a quarter turn to move bodily the mandrel having the shirred casing thereon to the compressing position. In the compressing position, the mandrel is held stationary while the compressor-doffer unit is moved forwardly toward the shirring head to compress the shirred casing against a plate. Meanwhile the next mandrel has been moved into the shirring head and the next casing is being shirred onto the same. The next movement of the turret through a quarter turn merely causes the mandrel with the compressed casing thereon to be moved through a quarter turn and to be held in the compressed position while a third casing is being shirred upon the third mandrel.

Next the turret is again rotated through a quarter turn to a position where the casing which has been held in the compressed condition for two quarter turns of the turret can be doffed from its mandrel by a forward movement of the compressor-doffer unit. Meanwhile, a fourth casing is being shirred upon a fourth mandrel.

The shirring head of the Korsgaard patent comprises a pair of endless chains, one located above and the other below the inflated casing that is to be shirred upon a mandrel. Each chain carries a number of trucks and each truck carries a shirring dog that is provided with a generally semi-cylindrical opening along its width for engaging the opposite sides of the inflated casing to move it along the mandrel. The shirring operation then will be performed, as above described, between the forward end of the compress-doffer unit and the last pair of shirring dogs which engage the casing. The trucks and shirring dogs for each chain are spaced apart along the casing a distance that is several times the width of the dog.

According to the Korsgaard patent, provision is made in the shirring head for guiding the trucks in such manner that the shirring dogs do not move relative to the casing to any appreciable extent. The reason for this is to avoid injury to the casing. Since the shirring dogs are mounted on the trucks which, in turn, are carried by chains, it necessarily follows that there must be a substantial distance between successive shirring dogs as described. For example, the distance between adjacent shirring dogs in the shirring head shown in the Korsgaard patent is of the order of six inches. Obviously it is several times the width of a shirring dog along the casing. From a consideration of the various positions of the shirring dogs shown in FIGURES 9 and 9A of the Korsgaard patent, it will be apparent that there must be a substantial spacing between the adjacent shirring dogs in order to permit the described movement thereof. Thus there is an inherent limitation in the previous construction with respect to the spacing of the shirring dogs in contact with the inflated casing which is to be shirred upon the retreating mandrel.

The automatic shirring machine disclosed in the Korsgaard patent has made it possible to shirr automatically sausage casings. Experience has indicated that improvements can be made which will result in a better product that can be shirred at a higher speed and which can be utilized by the sausage stuffer more advantageously than was previously possible.

An analysis of the operation of the shirring head with the shirring dogs spaced apart several times their width, as in the Korsgaard patent, shows that the shirring of the casing takes place both in the section thereof immediately ahead of the last set of the shirring dogs in contact with the casing and also at the far end of the unshirred section of the casing and adjacent the previously shirred casing.

For example, when the shirring dogs are spaced apart six inches, just after a set of shirring dogs has left the casing, there is an unshirred length of approximately six inches between the previously shirred portion of the casing and the next set of shirring dogs in engagement therewith. As this set of shirring dogs advances, initial shirring takes place in the inch to inch and a half section immediately ahead of them and also it takes place in the inch to inch and a half section at the opposite end of this six-inch length of casing adjacent to the previously shirred portion. The intervening three or four inches of the casing at this particular time is unshirred. As this set of shirring dogs advances, the unshirred intervening portion becomes shirred with the action being initiated from the ends.

Since it is not possible to hold the unshirred casing exactly symmetrically with respect to the shirring mandrel, there is a tendency for the shirring action to take place somewhat unsymmetrically, particularly at the intermediate portion of the six-inch length referred to. As a result, the outline of the folds or pleats presents an irregular or wavy line in contrast to a straight line or a cylindrical envelope with the cylinder being of uniform diameter from end to end. Moreover, because of the segregation in the shirring action at the ends of the six-inch lengths, there is a tendency for the casing, shirred as described, to separate slightly or for the shirred and compressed length of casing to be non-rigid or articulated at spaced locations therealong. When it is recalled that a forty-foot length of casing is shirred and compressed to a length of six to eight inches, it will be appreciated that this segregation or articulation takes place at intervals which may be a few inches apart.

In applying such a casing to the stuffing horn, it is necessary for the operator to use both hands to hold the shirred and compressed casing in such position that the opening therethrough will be in registry with the stuffing horn. If this is not done, it is likely that the shirred and compressed casing will break over and hang downwardly from a portion already applied to the stuffing horn. This does not mean that the wall of the casing has been broken but rather that a portion of the shirred casing extends at angle to the balance of it. If care is not taken, it is likely that the end of the stuffing horn will rupture the casing at this point.

Because of the irregularities in the shirring of sausage casings in the manner described, it has been found desirable to employ a relatively small mandrel onto which the casing is shirred. This leaves a correspondingly smaller diameter opening through the shirred casing and requires that a corresponding smaller diameter stuffing horn is employed. Where a larger mandrel is employed in connection with the shirring operation, a correspondingly larger diameter opening is left in the shirred casing. However, because of the irregularities referred to, it has been found that such a shirred casing is more likely to be ruptured than is the case where a smaller diameter mandrel is employed. The advantage of using the larger mandrel lies in the fact that it is possible then to leave a larger opening through the shirred casing and to apply it to the stuffing horn having a larger diameter. Then the casing can be stuffed at a higher rate than is possible when a smaller diameter stuffing horn is employed.

The Blizzard et al. patents disclosed improvements over the construction shown in the Korsgaard patent. In particular, the improvements resided in the shirring head and the manner in which the shirring operation is performed. Generally, the turret and other parts of the automatic shirring machine in the Blizzard et al. patent are essentially the same as set forth in the Korsgaard machine or a single mandrel machine of the type shown in the Dietrich patent could be used. In the Blizzard et al. shirring machine, the principal improvements consisted of the use of shirring lugs mounted at relatively close intervals on a shirring belt and arranged with the lugs staggered relative to each other so that shirring force would be applied to casing from one side only, with a pleat being formed in the space between the lugs on the opposite side of the casing from the point at which the shirring force is applied.

Figure 6:

This construction resulted in the formation of tightly compacted nested pleats with each successive pleat being orbitally displaced about the axis of the casing. The strand of shirred casing formed by the method and apparatus of the Blizzard et al. patents is one in which there are a plurality of helically spaced major folds interspersed with minor folds. The major folds overlie the minor folds and the strand is tightly compacted to form a continuous and uniform concave nested structure which is relatively rigid from end to end. While the main emphasis in the Blizzard et al. patents is on the use of a pair of shirring belts positioned on opposite sides of the shirring mandrel with the lugs on the belts in staggered relation, several specific examples are given of the use of greater numbers of shirring elements, viz three-belt and four-belt constructions as shown in FIGS. 7 and 6, respectively, of the Blizzard et al. patent.

In the Blizzard et al. patent the major advance over the prior art consisted of the close spacing of the shirring lugs on shirring belts that were positioned on opposite sides of the shirring mandrel and the use of shirring lugs which were staggered so that a pleat produced by one lug would be formed in the space between lugs on the opposite side of the mandrel.

The Matecki patents contributed mainly to the theory of shirring operation. Matecki disclosed apparatus using shirring wheels, which are the functional equivalent of shirring belts shown in the Blizzard et al. patents, in which the wheels are provided with spaced lugs arranged so that two lugs cooperate to apply a shirring force in the same manner as a single lug in the Blizzard et al. machine. In one embodiment of the Matecki apparatus, three shirring wheels are used with the shirring lugs arranged so that the shirring force is applied by two adjacent shirring wheels and a pleat formed in the space above a lower lug on the opposite shirring wheel. Thus, the arrangements of the shirring wheels is such that the lugs on two adjacent wheels are closely spaced relative to the mandrel while the lug on the third wheel is at some distance from the mandrel to provide a space in which a pleat is formed. The configuration of lugs is such that as the wheels are rotated the closely spaced lugs and the more distant lug (or lugs, in the four wheel embodiment disclosed) are successively on different wheels so that the space provided for pleat formation rotates around the mandrel as the shirring wheels are rotated.

This shirring wheel design results in the formation of a shirred strand of casing in which the pleats are formed in three (or four, as the case may be) substantially equal spaced positions. The shirred strand is characterized by an ordered repeated shirring pattern which is described in the Matecki patent as being comprised of three or four discrete successive longitudinally collapsed sections of casing each section having an ovate cross-section with a base adjacent to the outer cylindrical surface and with the collapsed sections successively angularly disposed with respect to each other in conically overlapping helical relationship about the axis of the hole through the strand. Thus, the Matecki patent provided a new terminology or theory for the description of the type of shirred strand that was produced by the apparatus disclosed in FIGS. 6 and 7 of the Blizzard et al. patents.

One object of this invention is to provide an improved apparatus and method for shirring tubular synthetic sausage casings and to provide an improved shirred casing.

Another object of this invention is to provide an improved method and apparatus for shirring tubular synthetic sausage casings in which circumferential major pleats are formed in the casing having a substantially random angular distribution.

Another object of this invention is to provide an improved shirred sausage casing having circumferentially disposed major pleats of random distribution with interposed minor pleats therein.

A feature of this invention is the provision of an improved method and apparatus for shirring tubular synthetic sausage casings in which a casing is inflated and fed along a mandrel and shirred with a plurality of identical shirring wheels each having closely spaced shirring lugs and arranged with the shirring lugs to engage the entire periphery of the inflated casing simultaneously in a very closely spaced relation to the shirring mandrel.

Another feature of this invention is the provision of a new and improved method and apparatus for shirring tubular synthetic casing in which the casing is inflated and fed along a mandrel and contacted simultaneously around its entire periphery with lugs positioned on shirring wheels, said lugs having a surface configuration to provide a relatively small circular passage around the shirring mandrel so that randomly disposed circumferential pleats are formed in the space between adjacent lugs.

Another feature of this invention is the provision of a new and improved shirred strand of synthetic sausage casing having circumferentially disposed major pleats interspersed with minor pleats, the major pleats being randomly disposed angularly about the strand and overlying the minor folds in tightly compacted and nested configuration.

Other objects and features of this invention will become apparent from time to time throughout the specification and claim as hereinafter related.

Figure 5:
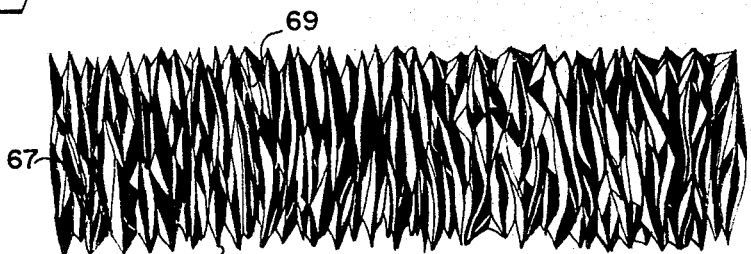

In the accompanying drawings, to be taken as part of this specification, there are clearly and fully illustrated several preferred embodiments of this invention, in which drawings, FIG. 1 is a view in elevation of a portion of a shirring machine showing a shirring head with a set of shirring wheels arranged to perform the method of this invention, FIG. 2 is an isometric view of one arrangement of shirring wheels relative to a shirring mandrel when used to carry out the instant invention, FIGS. 2a, 2b and 2c are cross-sectional views taken perpendicular to the shirring mandrel at successive stages of operation of the shirring wheels to show the relation of the shirring lugs to the mandrel as the shirring wheels are rotated, FIG. 3 is an isometric view of another type of shirring wheel and mandrel arrangement for carrying out the method of this invention, FIG. 3a is a sectional view taken perpendicular to the shirring mandrel in FIG. 3 showing the relation of the shirring lugs to the mandrel, FIG. 3b is a sectional view similar to that shown in 3a but showing the formation of a circumferential pleat in the space between the shirring lugs, FIG. 4 is a side elevation with one of the shirring wheels removed to illustrate the cooperative action of the shirring lugs in forming circumferentially disposed randomly located pleats in a tubular casing, FIG. 5 is a view in side elevation of a portion of casing which has been shirred, using the shirring wheel arrangement shown in FIG. 3, in which the pleats are slightly separated, FIG. 6 is a view of casing shirred on the apparatus as illustrated in FIG. 2 with the pleats partially separated to show the irregular location of the major and minor pleats, FIG. 7 is a diagrammatic view in elevation of an alternate embodiment of the invention using two shirring wheels, FIG. 8 is a view in end elevation, partially in broken section, showing the relationship of the shirring lugs to the mandrel in the apparatus shown in FIG. 7, FIG. 9 is a view in elevation of a still further embodiment of the invention using four shirring wheels, and, FIG. 10 is a view in end elevation, at least partially in broken section, showing the relationship of the shirring lugs to the mandrel.

The invention is based upon the discovery that an improved shirred tubular casing can be produced using identical shirring wheels having closely spaced narrow shirring lugs which are positioned to contact the casing simultaneously. The casing is fed along a mandrel in an inflated condition and contacted with the shirring lugs which come in close proximity to the mandrel. The shirring wheels are equidistant from the axis of the mandrel. The clearance between the shirring lugs and the mandrel is relatively small with the result that the casing is indented around its entire periphery and a circumferential pleat is formed into the space between the lugs on the shirring wheel producing circumferential major pleats of random distribution overlying a plurality of minor pleats.

Referring now to FIGURE 1 of the drawings, the improved process and apparatus of this invention is illustrated as applied to a shirring machine of the type shown in the Blizzard et al. patents using a plurality of shirring wheels in place of the shirring belts. In comparing the apparatus of FIG. 1 with the corresponding figure in the Blizzard et al. patent, the same reference numerals are not used for the same parts shown in that patent, but the correspondence of parts and manner of operation will be apparent. In FIG. 1 the reference numeral 1 is applied generally to an angle iron welded and plate welded frame. Frame 1 includes vertically extending angles 2 and 3 and supporting plate 4. At the upper edge of frame 1 are horizontally extending angles 5 and transversally extending angles 6. On angles 5 there is supported a plate 7 which carries measuring roll 8 and squeeze roll 9. Rolls 8 and 9 are mounted on support plates 10. Cooperating with measuring roll 8 is a metering disc 11 which cooperates with measuring limit switch 12 for stopping further operation of the shirring head when a predetermined length of casing has been shirred.

The shirring head which is generally designated as 13 is supported by upwardly extending plates 14 and 15 and horizontally extending supporting plates 16 and 17. The shirring head 13 is arranged to receive a relatively thin walled synthetic sausage casing 18 from reel 19 which is rotatively mounted on shaft 20. As the casing 18 comes from the reel 19, it is flat in the form of reel stock and passes between measuring roll 8 and squeeze roll 9 and then is inflated as shown at 21 by compressed air or other gas fed through the shirring mandrel. Squeeze roll 9 is adjustable by lever 22 for initial threading of casing into the machine. The inflated casing is fed over a shirring mandrel 60 (see FIGS. 2 and 3) and passes between upper and lower rollers 23 and 24. Roller 23 operates a tear limit switch which stops the shirring head in the event that the casing becomes torn, and roller 24 limits the downward movement of roller 23 when the casing is deflated. The casing also passes between guide rollers 25 mounted on upwardly extending arms 26.

The inflated casing 21 next passes between upper and lower feed belts 27 and 28 which cooperate to form the closed circular passage which assists in feeding the casing to the shirring wheels. Feed belt 27 is guided and driven by rollers 29, 30, 31 and 32.

Feed belt 28 is driven in coordination with belt 27 by rollers 33, 34, 35, and 36. The drive rollers for belts 27 and 28 may be driven by motor 37 mounted on plate 16 at the upper end of the shirring head 13 or may be driven by a separate independent motor (not shown). In this type of shirring machine, the belts 27 and 28 are used for the dual function of feeding inflated casing 21 to the shirring wheels and applying a lubricant, such as oil, to the exterior of the casing.

The inflated casing 21 is fed into a plurality of shirring wheels 38 which are mounted on end plate 15. Shirring wheels 38 are driven by motor 37 or any other suitable power source. In FIG. 1 the details of shirring lug construction are not shown for the shirring wheels 38 but the shirring wheel design is shown in detail in FIGS. 2 and 3.

Casing 21 is shirred on the mandrel 60 by shirring wheels 38 and the shirred product is removed by the portion of the apparatus to the left of the shirring wheels, which is not shown. That portion of the shirring apparatus can consist of a mandrel turret arrangement of the type shown in the aforementioned Korsgaard patent or a floating mandrel arrangement of the type shown in the Dietrich patent or in U.S. Patent 3,112,512, or other suitable apparatus for supporting the shirring mandrel and removing the shirred product.

A lubricant storage tank 39 is supported by plates 40 and 41 and is secured to shirring head plates 14. The storage tank 39 has an inlet opening 42 and a bottom outlet opening connected to tubing 43 which is in turn connected to a manifold 44. Manifold 44 is connected to a plurality of valves 45 and outlet tubes 46 which are arranged to supply lubricant to brushes 47 which are in turn positioned for engagement with feed belts 27 and 28 and with shirring wheels 38. The lubricant which is applied to the feed belts and shirring wheels is preferably mineral oil, although other lubricants such as vegetable oils, glycerine, etc. can be used. The function of the lubricant is to lubricate the surface of the casing being shirred to prevent damage during shirring and also to facilitate slippage of the casing through the sizer device which is normally used in the stuffing of casing at a packing plant.

In the operation of this apparatus, the casing 18 is inflated at 21 by introduction of air or other compressed gas through the hollow mandrel 60. Oil is generally introduced through the mandrel along with the air to provide lubrication for the interior of the casing moving along the mandrel. The inflated casing 21 is fed through the shirring head and shirred by the apparatus. The casing is accurately metered by rolls 8 and 9 (the drive mechanism for metering roll 8 is not shown). Oil or other lubricant is metered at a predetermined rate by valves 45 to brushes 47 which lubricates feed belts 27 and 28 and shirring wheels 38 so that the casing is lubricated as it is shirred.

In prior art shirring machines, the shirring apparatus is somewhat different from that used in this invention. In the Dietrich and Korsgaard patents, the shirring is effected by shirring dogs which are carried on chains and arranged in pairs on opposite sides of the casing to be shirred. The dogs would engage and indent the inflated casing around the shirring mandrel simultaneously and draw a pleat into position. In the Blizzard et al. apparatus, the shirring apparatus used a plurality of shirring belts equally spaced around the mandrel and arranged to engage the inflated casing to shirr it in the desired manner. In the Blizzard et al. apparatus the shirring function is carried out by lugs on shirring belts which are preferably arranged so that the lug on one belt is opposite an open space on the other belt. In the preferred Blizzard et al. apparatus, the lugs are therefore, staggered and cause a pleat which is formed by the action of one lug to be thrown into the open space between the lugs immediately opposite it. In the Matecki apparatus, the shirring is carried out by three or more shirring wheels which are arranged so that the shirring lugs on two wheels cooperate to perform the same function as a shirring lug in the Blizzard et al. apparatus. Two shirring lugs on adjacent shirring wheels in the Matecki apparatus engage the inflated casing and throw a pleat into a space above a low lug on the third wheel, or above two low lugs on a third and fourth wheel.

In this invention, the shirring wheels 38 are shown in detail in FIG. 2. Shirring wheels 38 are identical to each other and have a plurality of closely spaced shirring lugs 61 which meet simultaneously around the mandrel as the wheels are rotated so that the inflated casing is indented around its entire periphery. In FIGS. 2a, 2b, and 2c sectional views are shown taken through the mandrel showing the alignment of successive lugs on the shirring wheels 38 as the wheels are rotated through successive positions. As is seen from the sectional views, the shirring lugs are closely spaced relative to the mandrel and form a small passage of noncircular cross-section which rotates around the mandrel as successive lugs are moved into cooperating engagement. The spacing of the lugs 61 relative to mandrel 60 is such that the inflated casing is indented around its periphery and a circumferential pleat is formed in the inflated casing which is folded or pleated into the space between the lugs in shirring contact and the next adjacent lugs.

A portion of casing is shirred by the apparatus of FIG. 2 as shown in FIG. 6 in a partially extended position. The casing is designated 62 and includes major pleats 63 and minor pleats 64. Major pleats 63 are disposed in a random manner circumferentially of the casing and overlie a plurality of minor pleats. When this strand is tightly compacted, the strand is self-supporting, rigid and unpleats easily when stuffed with sausage emulsion in a packing plant.

FIGURE 3 of the drawing shows an alternate set of shirring wheels designated 38a which are used in the apparatus of FIG. 1 in place of shirring wheels 38. The shirring lugs 65 on shirring wheels 38a are of identical size and shape and meet simultaneously around the mandrel 60 to define a circular passageway having a very narrow clearance relative to the mandrel. The passage formed by shirring lugs 65 as they meet adjacent the mandrel 60 is shown in FIG. 3a. The shirring lugs 65 are adjusted so that they meet simultaneously in the manner shown in FIG. 5 as they pass the mandrel 60. As the shirring lugs 65 engage the inflated casing around its entire periphery, they indent the casing and form a circumferential pleat indicated at 66 in FIG. 3b, which pleat forms in the space between the lugs 65 in shirring contact with the inflated casing and the next adjacent lugs 65.

In FIG. 4 of the drawing, a detailed view is shown of the relationship of the shirring wheels 38a to inflated casing 21 and shirring mandrel 60. Only two of the shirring wheels 38a are shown so that the shirring operation can be observed more clearly. The shirring lugs 65 of the third shirring wheel are shown in dotted line to indicate the manner in which the lugs 65 meet simultaneously adjacent mandrel 60 and form circumferential pleats in the casing. A portion of the shirred casing designated 67, which is produced using the shirring wheels shown in FIGS. 3 and 4, is shown in more detail in FIG. 5 and consists of a plurality of major pleats 68 which are formed circumferentially of the casing and disposed in a random manner overlying a plurality of minor pleats. The shirred strand has a smooth exterior surface and is rigid and easy to handle.

In FIGS. 7 and 8 of the drawing, an alternate embodiment of the invention is shown using only two shirring wheels. In FIG. 7, shirring wheels 38b are shown having equally spaced lugs 69a with semicircular faces. Shirring lugs 69a meet successively adjacent to the mandrel and define a passage of circular cross-section (as shown in FIG. 8) having a very small clearance around the shirring mandrel 60. Shirring wheels 38b are operated simultaneously to bring the shirring lugs 69a into the position shown in FIG. 8 as the lugs are successively rotated into a position closely adjacent to mandrel 60. As the lugs 69a engage the pleated casing 21 around its entire periphery, a circumferential pleat is formed and thrown into the space between the lugs making shirring contact and the next adjacent lugs. The circumferential major pleat which is formed has a random disposition angularly around the shirred casing and overlies the plurality of minor pleats. The shirred strand of casing which is formed has a pleat structure substantially the same as that shown in FIG. 5.

In FIGS. 9 and 10 of the drawings, still another embodiment of the invention is shown in which four shirring wheels are used in place of the three shirring wheels of FIGS. 1 to 4. In FIG. 9 shirring wheels 38c are provided which have equally spaced lugs 70 which meet simultaneously adjacent mandrel 60. Shirring lugs 70 have a configuration which defines a circular passage having a very small clearance relative to mandrel 60. As shirring wheel 38c are rotated the lugs 70 are brought successively into the relation shown in FIG. 10. Shirring lugs 70 engage the entire outer periphery of the inflated casing 21 and cause a circumferential pleat to be formed which is displaced into the space between the lugs in shirring contact and the next adjacent lugs. The shirred product which is formed has a plurality of circumferentially disposed major pleats which are located in a random manner angularly around the shirred product and which overlie the plurality of minor pleats. The shirred product is tightly compacted when compressed and capable of being handled without separation at the pleats.

While this invention is particularly applicable to the shirring of sausage casings of cellulose of the type used for the preparation of frankfurters, the process is obviously applicable to the shirring of a wide range of casings. The process is primarily used for thin walled regenerated cellulose casings but can be used for sausage casings of thicker walled construction of the type used for processing large sausages, e.g. bolognas, salamis, etc., and may be used for fibrous casings or casing of a non-cellulosic type, e.g. alginate, amylose, starch, collagen, etc.

While the invention has been described with special emphasis upon certain embodiments and certain preferred processing conditions, it will be obvious that variations in process technique can be made without departing from the invention concept. It will, therefore, be obvious to any person skilled in the art that within the scope of the appended claim this invention can be practiced otherwise than as specifically described herein.

What is claimed is:

A method of shirring synthetic tubular sausage casing which comprises inflating a casing with gas, moving the inflated casing along a hollow mandrel, sequentially and continuously applying a shirring force to indent the inflated casing simultaneously around its entire periphery from at least two opposite directions and at successive intervals that are relatively short compared to the diameter of the casing, and retarding the linear movement of the indented casing to effect formation of a circumferentially disposed pleat.

References Cited by the Examiner

UNITED STATES PATENTS

| | | | |
|---|---|---|---|
| 2,001,461 | 5/1935 | Hewitt | 99—176 |
| 2,722,714 | 11/1955 | Blizzard et al. | 17—42 |
| 2,819,488 | 1/1958 | Gimbel | 17—42 |
| 2,983,949 | 5/1961 | Matecki | 17—42 |
| 2,984,574 | 5/1961 | Matecki | 99—176 |

A. LOUIS MONACELL, *Primary Examiner.*

HYMAN LORD, *Examiner.*